United States Patent
Futa et al.

(10) Patent No.: US 9,353,688 B2
(45) Date of Patent: May 31, 2016

(54) HIGH PRESSURE, MULTIPLE METERING ZONE GAS TURBINE ENGINE FUEL SUPPLY SYSTEM

(71) Applicant: HONEYWELL INTERNATIONAL INC., Morristown, NJ (US)

(72) Inventors: Paul W. Futa, North Liberty, IN (US); Edward Zielinski, South Bend, IN (US); Larry Portolese, Granger, IN (US); David Tuttle, South Bend, IN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 497 days.

(21) Appl. No.: 13/828,199

(22) Filed: Mar. 14, 2013

(65) Prior Publication Data

US 2014/0196459 A1    Jul. 17, 2014

Related U.S. Application Data

(60) Provisional application No. 61/753,611, filed on Jan. 17, 2013.

(51) Int. Cl.
*F02C 7/22* (2006.01)
*F02C 7/236* (2006.01)

(52) U.S. Cl.
CPC .. *F02C 7/22* (2013.01); *F02C 7/236* (2013.01)

(58) Field of Classification Search
CPC ............ F02C 7/22; F02C 7/228; F02C 7/232; F02C 7/236; F02C 9/293; F04B 23/04
USPC .................... 60/734, 739, 740, 746
See application file for complete search history.

(56) References Cited

U.S. PATENT DOCUMENTS

| | | | |
|---|---|---|---|
| 4,245,964 A | 1/1981 | Rannenberg | |
| 5,715,674 A | 2/1998 | Reuter et al. | |
| 6,079,198 A | 6/2000 | Prowse et al. | |
| 6,666,015 B2 | 12/2003 | Dyer | |
| 7,096,658 B2 | 8/2006 | Wernberg et al. | |
| 7,234,293 B2 | 6/2007 | Yates et al. | |
| 7,565,793 B2 * | 7/2009 | Shelby et al. | 60/39.463 |
| 7,841,841 B2 * | 11/2010 | Arnett et al. | 417/304 |
| 7,878,003 B1 | 2/2011 | Smith | |
| 8,205,597 B2 | 6/2012 | Brocard et al. | |
| 8,348,633 B2 | 1/2013 | Adams et al. | |
| 2005/0284148 A1 | 12/2005 | Wernberg et al. | |
| 2009/0031821 A1 * | 2/2009 | Rowan et al. | 73/861.74 |
| 2011/0162724 A1 | 7/2011 | Kleckler | |
| 2012/0156061 A1 | 6/2012 | Baker et al. | |
| 2012/0234014 A1 | 9/2012 | Reuter et al. | |
| 2012/0234015 A1 | 9/2012 | Reuter | |

* cited by examiner

*Primary Examiner* — Patrick Hamo
(74) *Attorney, Agent, or Firm* — Ingrassia Fisher & Lorenz, P.C.

(57) ABSTRACT

A gas turbine engine fuel supply system includes a primary gear pump, a secondary gear pump, and a pump bypass valve. The primary gear pump always actively delivers fuel to the downstream fuel system, and is sized to supply 100% of the burn flow needed at a select low demand condition. The secondary gear pump is sized to make up the remainder of the flow at high demand conditions, and actively delivers fuel to the downstream fuel system only during those conditions. To supply discharge fuel pressures in excess of gear pump capability, a supercharger pump is disposed upstream of the primary and secondary gear pumps. The pump bypass valve is configured to regulate fuel pressure at the primary gear pump outlet to one of a plurality of preset differential pressures above one of a plurality of fuel load pressures and prevents reverse pressurization of the gear pumps.

18 Claims, 5 Drawing Sheets

HIGH PRESSURE, MULTIPLE METERING ZONE GAS TURBINE ENGINE FUEL SUPPLY SYSTEM

CROSS-REFERENCE TO RELATED APPLICATIONS

This application claims the benefit of the benefit of U.S. Provisional Application No. 61/753,611, filed Jan. 17, 2013.

TECHNICAL FIELD

The present invention generally relates to gas turbine engine fuel control, and more particularly relates to a system and method for supplying fuel at multiple pressures to multiple metering zones in a gas turbine engine.

BACKGROUND

Typical gas turbine engine fuel supply systems include a fuel source, such as a fuel tank, and a main fuel pump that receives fuel drawn from the fuel source and delivers pressurized fuel to the fuel manifolds in the engine combustor via a main supply line. The main fuel pump is typically implemented using a positive displacement pump that is driven directly by the engine gearbox. Thus, the fuel flow supplied by the main fuel pump is proportional to engine speed.

The fixed displacement of a main fuel pump is typically sized to produce the fuel flow that is needed to run the engine at a max demand case, which is typically during engine start-up, where engine speed is relatively low, or during takeoff, where fuel demand is relatively high. As such, at other operating conditions, such as idle or high altitude cruise, the main fuel pump supplies much more fuel than the engine needs. In many instances, the excess fuel is recirculated back to the low pressure pump inlet or some other low pressure point upstream of the main fuel pump.

The known fuel supply systems described above generally operate safely and robustly, but can exhibit certain drawbacks. For example, recirculating the excess fuel from the main fuel pump wastes energy by generating heat, and can lead to undesirably high fuel temperatures. Moreover, developments in turbine engine combustors are driving up the required fuel pressures, and include multiple, separate combustor zones. The increased fuel pressures are, in many instances, beyond the level that can be produced by a single positive displacement pump (gear or vane). In addition multiple fuel metering circuits are needed to supply fuel to the separate combustor zones, a departure from the known fuel supply systems in which the unneeded fuel from a single metering circuit is recirculated back to the low pressure pump inlet.

Hence, there is a need for a gas turbine engine fuel supply system that wastes less energy than presently known systems, supplies higher fuel pressures than presently known systems, and does so to separate combustor zones. The present invention meets at least these needs.

BRIEF SUMMARY

In one embodiment, a gas turbine engine fuel supply system includes a primary gear pump, a secondary gear pump, a supercharger pump, a pump control valve, and a pump bypass valve. The primary gear pump has a primary gear pump inlet and a primary gear pump outlet. The primary gear pump is adapted to receive a drive torque and is configured, upon receipt thereof, to draw fuel into the primary gear pump inlet and discharge the fuel from the primary gear pump outlet. The secondary gear pump has a secondary gear pump inlet and a secondary gear pump outlet. The secondary gear pump is adapted to receive a drive torque and is configured, upon receipt thereof, to draw fuel into the secondary gear pump inlet and discharge the fuel from the secondary gear pump outlet. The supercharger pump has a supercharger pump inlet and a supercharger pump outlet. The supercharger pump is adapted to receive a drive torque and is configured, upon receipt thereof, to draw fuel into the supercharger pump inlet and discharge the fuel from the supercharger pump outlet. The pump control valve is configured to selectively fluidly isolate the supercharger pump from the primary and secondary gear pumps, and fluidly isolate the primary gear pump outlet from the secondary gear pump outlet, and is further configured to fluidly communicate the supercharger pump outlet with the primary gear pump inlet and the secondary gear pump inlet and fluidly communicate the primary gear pump outlet and the secondary gear pump outlet. The pump bypass valve is in fluid communication with the primary gear pump outlet and is configured to regulate fuel pressure at the primary gear pump outlet to one of a plurality of preset differential pressures above one of a plurality of fuel load pressures.

In another embodiment, a method of controlling the supply of fuel to a gas turbine engine includes simultaneously supplying, from a fuel source, fuel to a first gear pump and a second gear pump. A first portion of the fuel is supplied to the gas turbine engine via the first gear pump while simultaneously recirculating a second portion of the fuel through the second gear pump. Fuel from the fuel source is selectively supplied to the first and second gear pumps via a supercharger pump, and is selectively supplied to the gas turbine engine via the first and second gear pumps. The pressure of the fuel supplied to the gas turbine engine is regulated to one of a plurality of preset differential pressures above one of a plurality of fuel load pressures.

Furthermore, other desirable features and characteristics of the gas turbine engine fuel supply system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
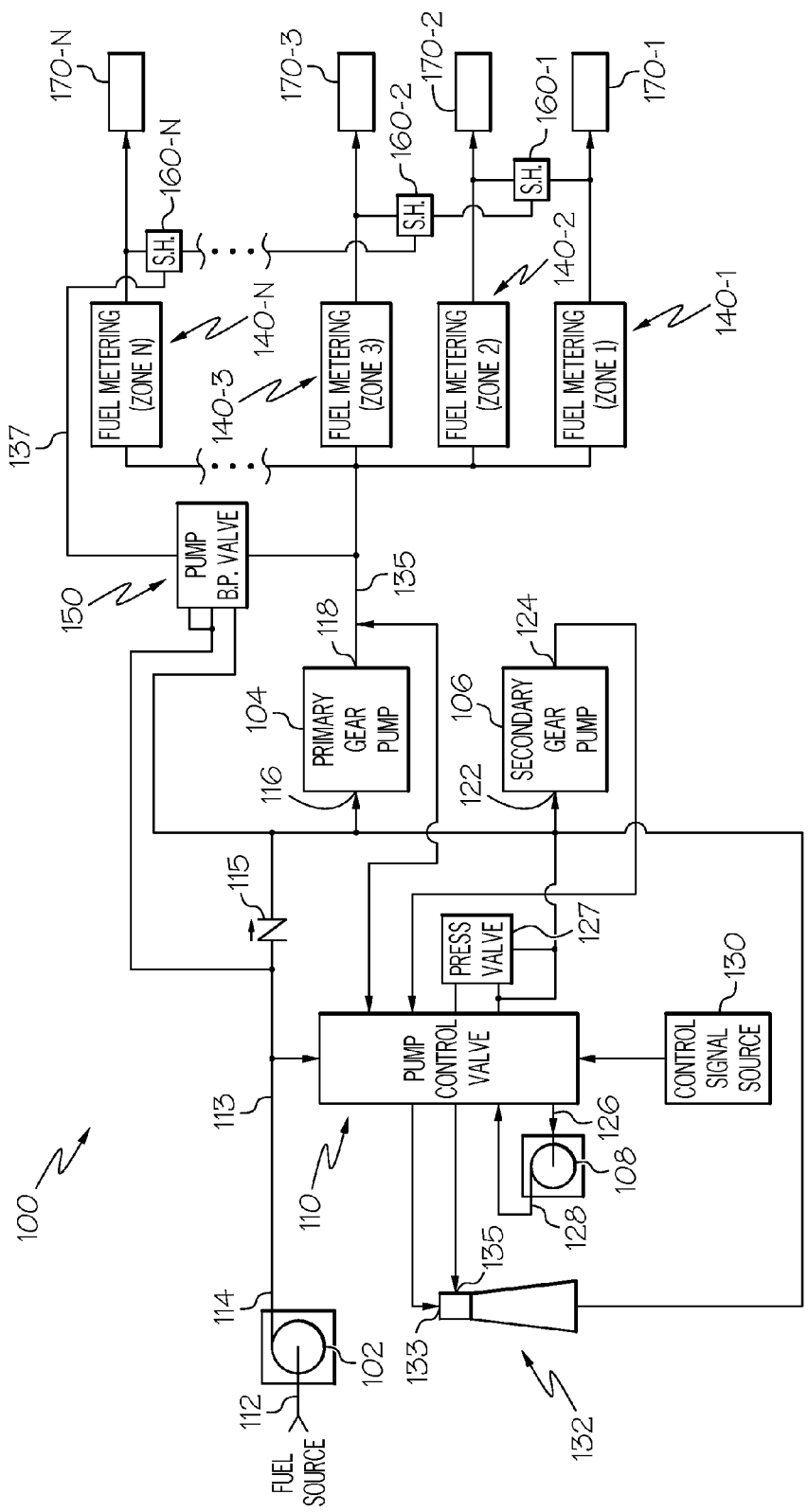
FIG. 1 depicts a functional block diagram of an embodiment of the fuel supply system.

Referring first to FIG. 1, a functional block diagram of an embodiment of the fuel supply system 100 is depicted, and includes a boost pump 102, a primary gear pump 104, a secondary gear pump 106, a supercharger pump 108, a pump control valve 110, a plurality of fuel metering subsystems 140 (e.g., 140-1, 140-2, 140-3, . . . 140-N), and a pump bypass valve 150. The boost pump 102 includes a boost pump inlet 112 and a boost pump outlet 114. The boost pump inlet 112 is adapted to be in fluid communication with a fuel source, such as a non-illustrated fuel tank. The boost pump outlet 114 is in fluid communication with the pump control valve 110, via a fuel supply line 113. As will be described further below, the boost pump outlet 114 is also selectively in fluid communication with the primary gear pump 104 and the secondary gear pump 106, via, for example, a check valve 115 disposed in the fuel supply line 113, or is in fluid communication with the supercharger pump 108, via the pump control valve 110. The boost pump 102 may be variously implemented, but is preferably implemented as a relatively low horsepower, low speed centrifugal pump. The boost pump 102, regardless of its specific implementation, is adapted to receive a drive torque and is configured, upon receipt thereof, to draw fuel into the boost pump inlet 112 and discharge the fuel from the boost pump outlet 114. The source of drive torque to the boost pump 102 may vary, but in the depicted embodiment the source is a gas turbine engine, and more particularly a gearbox coupled to the gas turbine engine.

The primary gear pump 104 includes a primary gear pump inlet 116 and a primary gear pump outlet 118. The primary gear pump inlet 116 is coupled to selectively receive fuel from either the boost pump 102, via the check valve 115, or the supercharger pump 108, via the pump control valve 110. The primary gear pump 104 is preferably implemented as a positive displacement pump that is adapted to receive a drive torque and is configured, upon receipt of the drive torque, to draw fuel into the primary gear pump inlet 116 and discharge pressurized fuel from the primary gear pump outlet 118 to the fuel metering unit (FMU) containing the plurality of fuel metering subsystems 140. The source of drive torque to the primary gear pump 104 may vary, but in the depicted embodiment the source is the gas turbine engine gearbox. It will be appreciated that the source of drive torque may be the same source that drives the boost pump 102, and can be driven at the same or different speed as the boost pump 102.

The secondary gear pump 106 includes a secondary gear pump inlet 122 and a secondary gear pump outlet 124. The secondary gear pump inlet 122 is also coupled to selectively receive fuel from either the boost pump 102, via the check valve 115, or the supercharger pump 108, via the pump control valve 110. Similar to the primary gear pump 104, the secondary gear pump 106 is adapted to receive a drive torque and is configured, upon receipt of the drive torque, to draw fuel into the secondary gear pump inlet 122 and discharge pressurized fuel from the secondary gear pump outlet 124. Preferably, the drive torque source is also the gas turbine engine gearbox and, as with the primary gear pump 104, it may the same source that drives the boost pump 102, and can be driven at the same or different speed as the boost pump 102. As will be described further below, the pressurized fuel discharged from the secondary gear pump outlet 124 is supplied, via the pump control valve 110, either back to the secondary gear pump inlet 122, via a pressurizing valve 127, or to the primary gear pump outlet 118.

The supercharger pump 108 includes a supercharger pump inlet 126 and a supercharger pump outlet 128. The supercharger pump inlet and outlet 126, 128 are each in fluid communication with the pump control valve 110. The supercharger pump 108 may be variously implemented, but is preferably implemented as a single stage, relatively high speed centrifugal pump. The supercharger pump 108, regardless of its specific implementation, is adapted to receive a drive torque. As will also be described further below, the supercharger pump 108 is configured, upon receipt of the drive torque, and depending upon the position of the pump control valve 110, to selectively draw fuel into the supercharger pump inlet 126 and discharge the fuel from the supercharger pump outlet 128. Here too, the drive torque source is preferably the gas turbine engine gearbox, but is preferably driven at a higher speed than the boost pump 102, the primary gear pump 104, and the secondary gear pump 106.

The pump control valve 110 is in fluid communication with the boost pump 102, the primary gear pump 104, the secondary gear pump 106, the supercharger pump 108, and, at least in the depicted embodiment, an ejector pump 132. The pump control valve 110 is coupled to receive a control signal and is movable, in response to the control signal, between a first control position and a second control position. In the first control position, the pump control valve 110 fluidly isolates the supercharger pump 108 from the boost pump 102 and the primary gear pump 104, fluidly isolates the primary gear pump outlet 118 from the secondary gear pump outlet 124, and also fluidly couples the secondary gear pump outlet 124 to a motive fluid inlet 133 of the ejector pump 132 and the supercharger pump outlet 128 to a suction fluid inlet 135 of the ejector pump 132. In the second control position, the pump control valve 110 fluidly isolates the secondary gear pump outlet 124 from the motive fluid inlet 133 and the supercharger pump outlet 128 from the suction fluid inlet 135, fluidly communicates the supercharger pump inlet 126 with the boost pump outlet 114, fluidly communicates the supercharger pump outlet 128 with the primary and secondary gear pump inlets 116, 122, and fluidly communicates the primary and secondary gear pump outlets 118, 124. Thus, when the pump control valve 110 is in the first control position (e.g., low demand case), only the primary gear pump 104 supplies pressurized fuel, via a main fuel supply line 135, to a plurality of independent fuel loads 170 (e.g., 170-1, 170-2, 170-3, . . . , 170-N). However, when the pump control valve 110 is in the second control position (e.g., high demand case), the primary and secondary gear pumps 104, 106 are connected in parallel and both supply pressurized fuel, at an increased pressure and via the main supply line 135, to a plurality of independent fuel loads 170.

The independent fuel loads 170 in the depicted system are a plurality of independent combustor zones, which may include, for example, a main zone and multiple pilot zones. No matter the specific implementation of each of the independent fuel loads 170, the flow of fuel from the main supply line 135 to each load is controlled via an associated one of the fuel metering subsystems 140 (e.g., 140-1, 140-2, 140-3, . . . 140-N). The fuel metering subsystems 140 are each configured to receive commands from, for example, an engine controller (e.g., a FADEC), and meter fuel, at or below a preset maximum pressure, to its associated fuel load 170.

The pump bypass valve 150 is in fluid communication with the main supply line 135, a select-high line 137, the fuel supply line 113 upstream of the check valve 115, and the fuel supply line 113 downstream of the check valve 115. The pump bypass valve 150 is configured to regulate the fuel pressure in the main supply line 135 to a preset differential pressure above the highest of the fuel load pressures. The highest fuel load pressure is supplied to the select-high line 137 via a plurality of cascaded, conventional, two-position select-high valves 160 (e.g., 160-1, 160-2, 160-3, . . . 160-N) that are disposed, one each, downstream of each of the fuel metering subsystems 140. The pump bypass valve 150 is additionally configured to bypass excess fuel downstream of the boost pump outlet 113 to maintain the preset differential pressure. As will be described in more detail further below, the bypass valve is further configured to adjust the preset differential pressure to ensure the primary and secondary gear pumps 104, 106 from being reverse pressurized when the pump control valve 110 is in the second control position and the supercharger pump 108 is supplying fuel to the primary and secondary gear pumps 104, 106.

It will be appreciated that the pump control valve 110, the fuel metering subsystems 140, and the pump bypass valve 150 may each be variously configured and implemented. In this regard, it will additionally be appreciated that the control signal supplied to the pump control valve 110 may be electric, pneumatic, hydraulic, or various combinations thereof, and that the source of the control signal 130 may be variously configured and implemented. In a particular embodiment, which is depicted in FIGS. 2 and 3, and which will now be described, the control signal is a hydraulic signal and the control signal source 130 is a controllable pilot valve, referred to herein as a pump control pilot valve 130.

Figure 2:
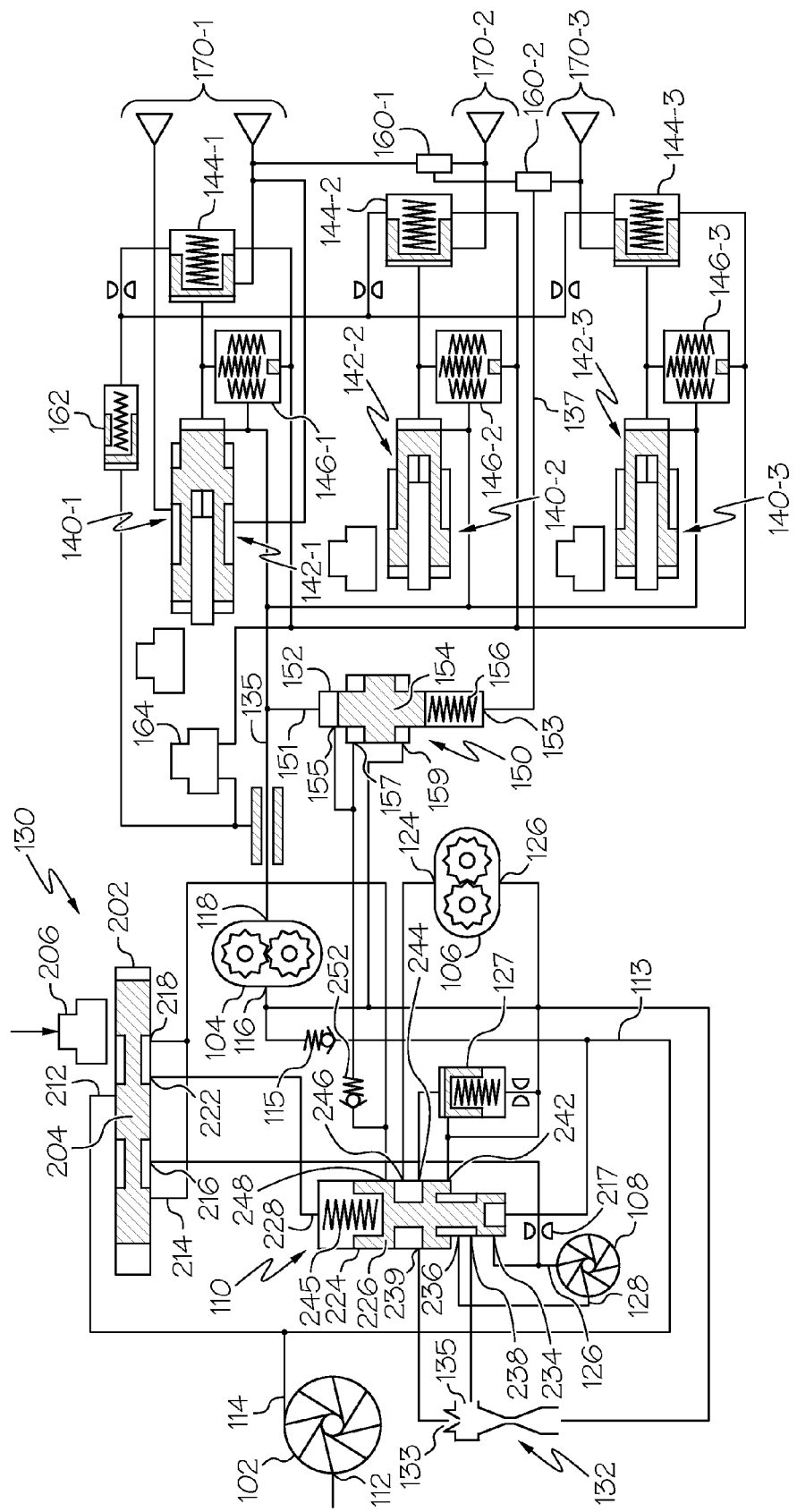
FIGS. 2 and 3 depict detailed schematic representations of one embodiment of the fuel supply system of FIG. 1 in two different operational modes.
Figure 3:
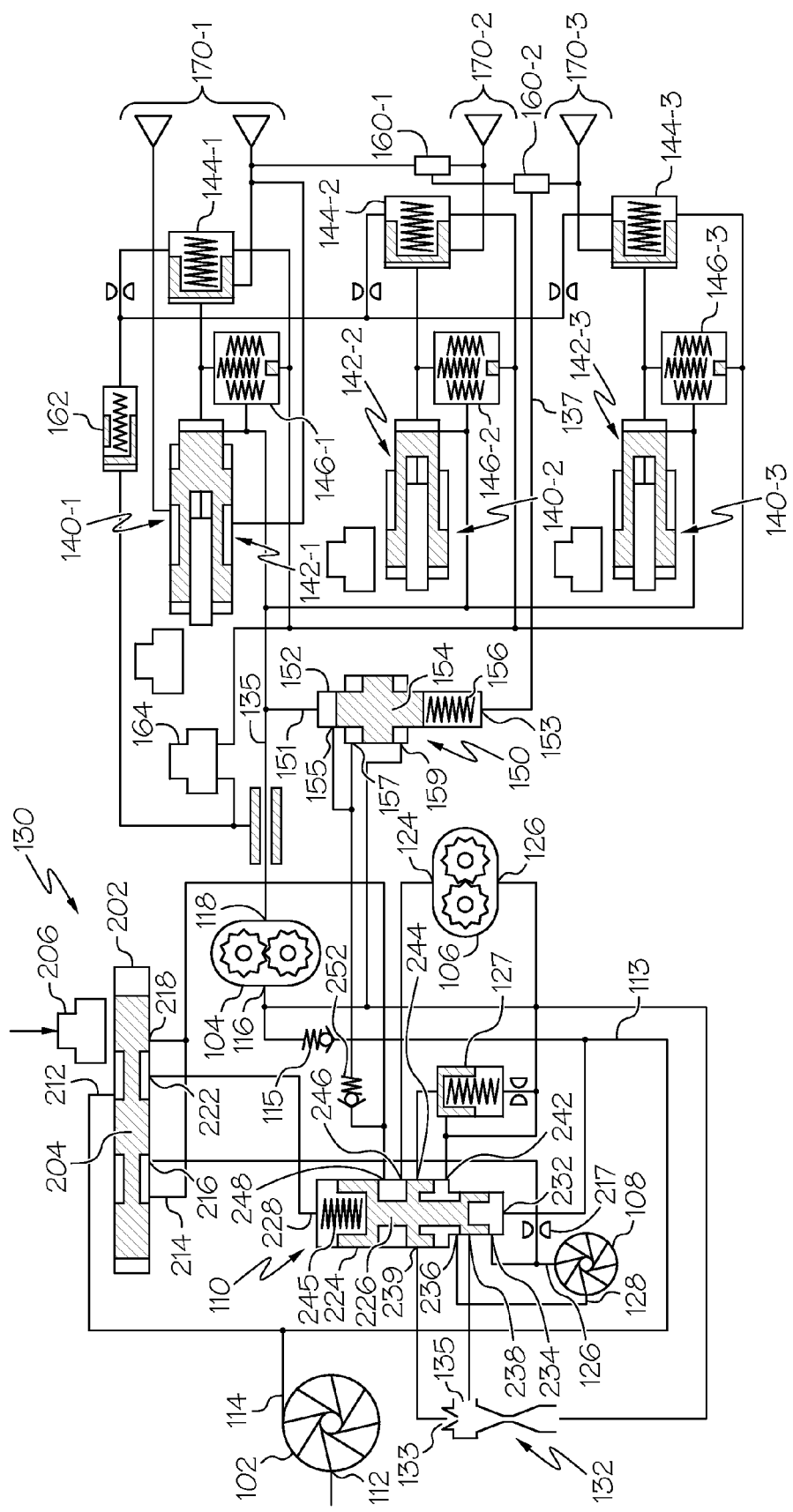

With reference to FIGS. 2 and 3, a more detailed schematic representation of the fuel supply system 100, schematically illustrating embodiments of the pump control valve 110 and the pump control pilot valve 130 in more detail, is depicted. This more detailed representation will now be described, beginning with a detailed description of the pump control pilot valve 130, and followed with a detailed description of the pump control valve 110. Before doing so, however, it is noted that the independent fuel loads in the particular system 100 depicted in FIGS. 2 and 3 are three independent fuel metering zones of a non-illustrated engine combustor—a pilot primary zone 170-1, a pilot secondary zone 170-2, and a main flow zone 170-3.

The pump control pilot valve 130 includes a pump control pilot valve body 202, a pump control pilot valve element 204, and a pilot valve actuator 206. The pump control pilot valve body 202 includes a low-pressure supply port 212, a supercharger feed inlet port 214, a supercharger feed outlet port 216, a control pressure inlet port 218, and a control pressure outlet port 222. The low-pressure supply port 212 is in fluid communication with a relatively low-pressure fuel source. In the depicted embodiment, the low-pressure fuel source is the boost pump outlet 114. The supercharger feed inlet port 214 is in fluid communication with the primary gear pump outlet 118, and the supercharger feed outlet port 216 is in fluid communication with the supercharger pump inlet 126, via a flow control orifice 217. The control pressure inlet port 218 is also in fluid communication with the primary gear pump outlet 118, and the control pressure outlet port 222 is in fluid communication with the pump control valve 110.

The pump control pilot valve element 204 is movably disposed within the pump control valve body 202 and is movable between a first pilot position and a second pilot position. In the first pilot position, which is the position depicted in FIG. 2, the pilot valve element 204 dead-heads the low-pressure supply port 212, fluidly isolates the supercharger feed inlet port 214 from the supercharger feed outlet port 216, and fluidly couples the control pressure inlet port 218 to the control pressure outlet port 222. In the second pilot position, which is the position depicted in FIG. 3, the pilot valve element 204 fluidly couples the low-pressure supply port 212 to the control pressure outlet port 222, fluidly couples the supercharger feed inlet port 214 to the supercharger feed outlet port 216, and fluidly isolates the control pressure inlet port 218 from the control pressure outlet port 222.

The pump control pilot valve element 204 is moved between the first and second pilot positions via the pilot valve actuator 206. The pilot valve actuator 206 is adapted to receive a command signal from an external source, such as an engine control (e.g., a FADEC) and is configured, in response to the command signal, to cause the pilot valve element 204 to move between the first and second pilot positions. In the depicted embodiment, the pilot valve actuator 206 is implemented as an electro-hydraulic servo valve (EHSV) that is configured, in response to the command signal, to controllably supply a control fluid pressure to the pump control pilot valve element 204 that moves the pump control pilot valve element 204 between the first and second pilot positions. It will be appreciated that the pilot valve actuator 206 may be variously configured and implemented. For example, it may be implemented using any one of numerous electric, hydraulic, pneumatic, electro-hydraulic, or electro-pneumatic types of actuators.

The pump control valve 110 includes a pump control valve body 224 and a pump control valve element 226. The pump control valve body 224 includes a control signal port 228, a boost pump outlet port 232, supercharger pump inlet port 234, a supercharger pump outlet port 236, a supercharger pump vent port 238, an ejector pump motive supply port 239, a combined gear pump inlet port 242, a pressurizing valve control port 244, a secondary gear pump outlet port 246, and a primary gear pump outlet port 248. The control signal port 228 is in fluid communication with the pump control pilot valve 130, and more specifically with the control pressure outlet port 222, and receives the control signal therefrom. The boost pump outlet port 232 is in fluid communication with the boost pump outlet 114 and receives a portion of the fuel discharged therefrom.

The supercharger pump inlet port 234 is in fluid communication with the supercharger pump inlet 126 and, via the flow orifice 217, the supercharger feed outlet port 216. The supercharger pump outlet port 236 is in fluid communication with the supercharger pump outlet 128. In the depicted embodiment, the supercharger pump vent port 238 is in fluid communication with the suction fluid inlet 133 of the ejector pump, and the ejector pump motive supply port 239 is in fluid communication with the motive fluid inlet 133 of the ejector pump 132. As FIGS. 2 and 3 also depict, the ejector pump 132 additionally includes an ejector pump outlet 137, which is in fluid communication with the primary and secondary gear pump inlets 116, 122.

Figure 4:
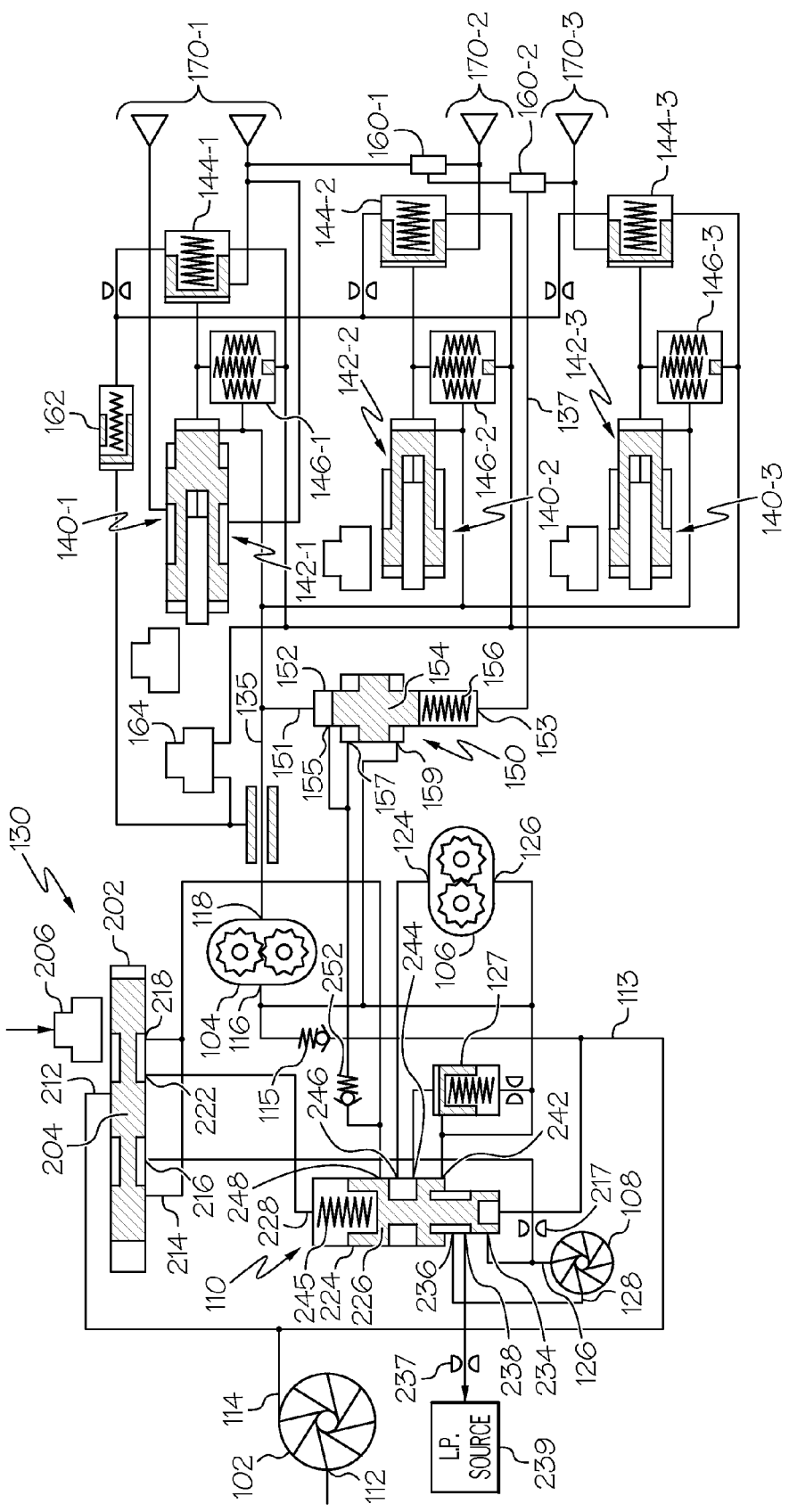
FIGS. 4 and 5 depict detailed schematic representations of an alternative embodiment of the fuel supply system of FIG. 1 in the two different operational modes.
Figure 5:
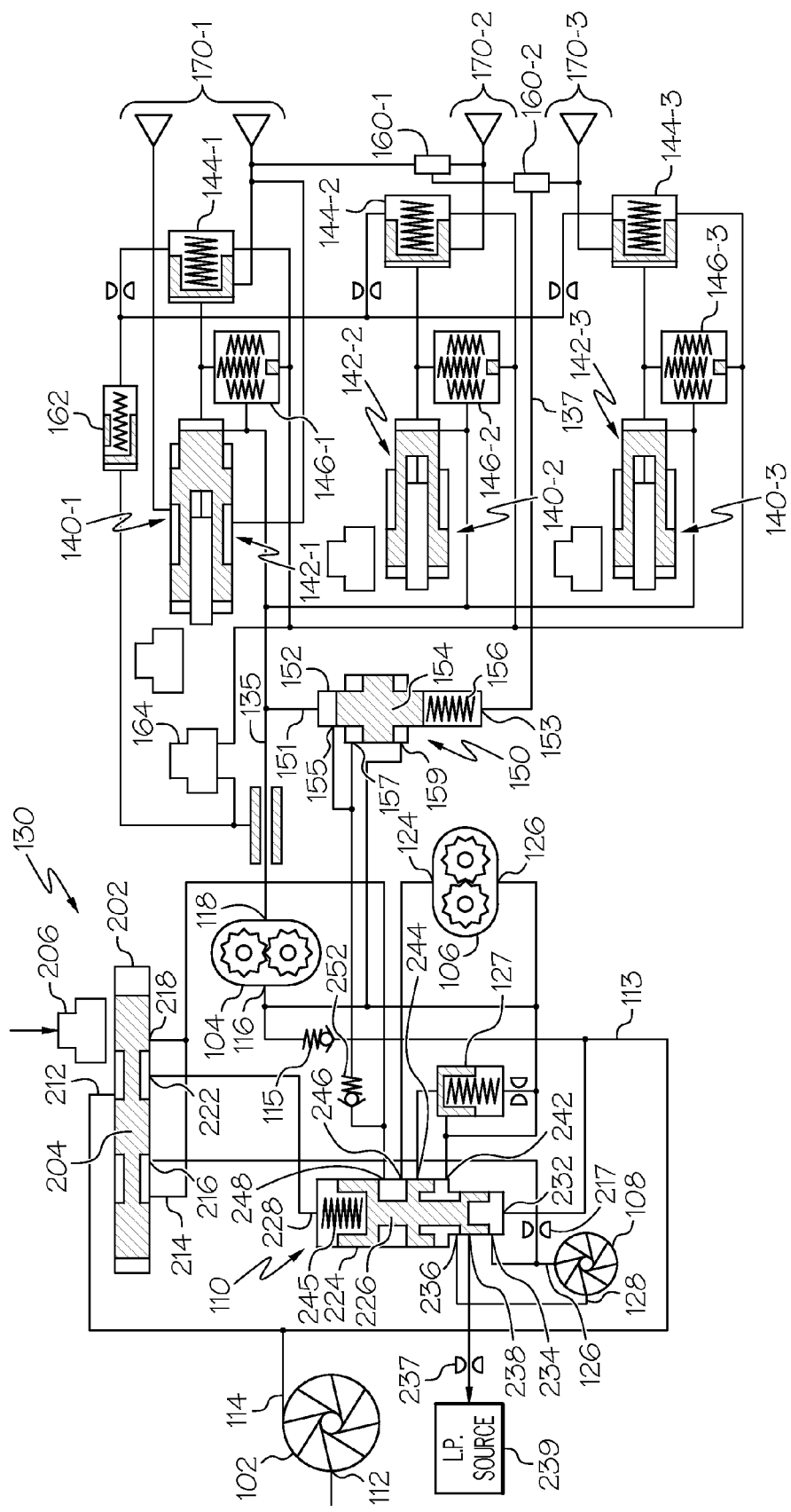

Before proceeding further, it is noted that in other embodiments, such as the one depicted in FIGS. 4 and 5, the system 100 could be implemented without the ejector pump 132. In such embodiments, the control valve 110 does not include the ejector pump motive supply port 239, and the supercharger pump vent port 238 is in fluid communication, via another flow orifice 237, with a relatively low-pressure fluid source 239. The relatively low-pressure fluid source 239 may vary, and may be, for example, a vent to air, such as the atmosphere or the top of the non-illustrated fuel tank, or to one or more other tank-like reservoirs. It is noted that this vent path, as well as the path provided by the ejector pump 132 in FIGS. 1-3, is provided so that the supercharger pump 108 does not overheat by continually pumping trapped fluid when the pump control pilot valve element 204 is in the first pilot position and the pump control valve 110 is in the first control position, and thus the fluid inlet paths to the supercharger pump 108 are blocked. The supercharger pump 108 will not overheat if it is spinning in air and/or vapor. With the embodiment depicted in FIGS. 1-3, the supercharger pump 108 is spinning in fuel vapor, and with the embodiment depicted in FIGS. 4 and 5, it is spinning in air.

Returning now to the description of FIGS. 2 and 3, the combined pump inlet port 242 is in fluid communication with the secondary gear pump inlet 122 and the pressurizing valve 128. The pressurizing valve control port 244 is also in fluid communication with the pressurizing valve 128. The secondary gear pump outlet port 246 is in fluid communication with the secondary gear pump outlet 124, and the primary gear pump outlet port 248 is in fluid communication with the primary gear pump outlet 118.

The pump control valve element 226 is movably disposed within the pump control valve body 224. The pump control valve element 226 is responsive to the control signal supplied from the pump control pilot valve 130 to move between a first control position and a second control position. In particular, as was noted above, when the pump control pilot valve element 204 is in the first pilot position, the control pressure inlet port 218 is fluidly coupled to the control pressure outlet port 222. Because the control signal port 228 is in fluid communication with the control pressure outlet port 222, the control signal supplied to the control signal port 228 is a relatively high fluid pressure signal from the primary gear pump outlet 118. This relatively high fluid pressure signal, together with a spring force supplied from a bias spring 245, overcomes other fluid pressure forces acting on the pump control valve element 226 to move (or maintain) the pump control valve element 226 to (or in) the first control position.

In the first control position, which is the position depicted in FIG. 2, the pump control valve element 226 fluidly isolates the supercharger pump inlet port 234, and thus the supercharger pump inlet 126, from the boost pump outlet 114, and fluidly couples the supercharger pump outlet port 236, and thus the supercharger pump outlet 128, to the supercharger pump vent port 238. The pump control valve element 226 also couples the secondary gear pump outlet port 246 to the pressurizing valve control port 244, and fluidly isolates the secondary gear pump outlet port 246 from the primary gear pump outlet port 248. Thus, as previously noted, only the primary gear pump 104 supplies pressurized fuel to the downstream fuel loads. At the same time, the secondary gear pump 106 is routed to the pressurizing valve 128, which idles the pressure rise of the secondary gear pump 106 to a relatively low differential pressure, thereby minimizing power extraction and heat generation. It is additionally noted that the supercharger pump 108 is preferably disengaged from a fluid source, further reducing power extraction.

When the pump control pilot valve element 204 is in the second pilot position, the low-pressure supply port 212 is fluidly coupled to the control pressure outlet port 222, the supercharger feed inlet port 214 is fluidly coupled to the supercharger feed outlet port 216, and the control pressure inlet port 218 is fluidly isolated from the control pressure outlet port 222. Because the control signal port 228 is in fluid communication with the control pressure outlet port 222, the control signal supplied to the control signal port 228 is a relatively low fluid pressure signal from the boost pump outlet 126. The combined fluid pressure forces acting on the pump control valve element 226 overcome the relatively low fluid pressure signal and the spring force supplied from the bias spring 245 to move (or maintain) the pump control valve element 226 to (or in) the second control position.

In the second control position, which is the position depicted in FIG. 3, the pump control valve element 226 fluidly couples the supercharger pump inlet port 234, and thus the supercharger pump inlet 126, to the boost pump outlet 114, and fluidly isolates the supercharger pump outlet port 236 from the supercharger pump vent port 238. However, the pump control valve element 226 fluidly couples the supercharger pump outlet port 236, and thus the supercharger pump outlet 128, to the combined gear pump inlet port 242, and thus to the primary and secondary gear pump inlets 116, 122. The pump control valve element 226 fluidly isolates the secondary gear pump outlet port 246 from the pressurizing valve control port 244, and fluidly couples the secondary gear pump outlet port 246 to the primary gear pump outlet port 248, and thus to the primary gear pump outlet 118. Thus, as was also previously noted, the primary and secondary gear pumps 104, 106 are connected in parallel and both supply pressurized fuel to downstream fuel loads at an increased pressure.

It should be noted that the system 100 is configured such that when the pump control pilot valve element 204 moves from in the first pilot position to the second pilot position, the pump control valve element 226 does not instantaneously move from the first control position to the second control position. Rather, the pump control valve element 226 slews to the second control position when the fuel vapor in which the supercharger pump 108 was spinning is recompressed into fluid (or the air in which the supercharger pump 108 was spinning is purged back to the relatively low-pressure fluid source 239, and fluid pressure from the supercharger pump 108 builds up in the pump control valve body 224. This recompressing/purging feature prevents a slug of air from being introduced into the downstream fuel system. It is further noted that the depicted system 100 includes an optional pump relief valve 252, fluidly coupled between the primary gear pump outlet 118 and the boost pump outlet 114.

In the particular embodiment depicted in FIGS. 2 and 3, each fuel metering subsystem 140 includes a metering valve 142 142-1, 142-2, 142-3), a throttle valve 144 (144-1, 144-2, 144-3), and a head sensor 146 (146-1, 146-2, 146-3). The metering valves 142 are each implemented using a conventional EHSV positioning a metering valve with position feedback provided by an LVDT (linear variable differential transformer). In the case of the pilot primary metering zone, its associated metering valve 142-1 is configured, via a second set of lands, to restrict fuel flow to non-enriched nozzles should an enrichment function be required in the combustor. The throttle valves 144 are each configured to maintain its associated metering head pressures. The head sensors 146 are each configured to sense and null out on metering head pressure by modulating the spring side pressure reference of its associated throttling valve 144.

Before proceeding further, it is noted that certain components depicted in FIGS. 2 and 3 are not depicted in the functional block diagram of FIG. 1 and were not previously described. These components include a head sensor regulator 162 and a shut-off/overspeed EHSV 164. The head sensor regulator 162 is configured to establish a consistent return pressure for each of the throttle valve 144/head sensor 146 loops. The shut-off/overspeed EHSV 164 is configured, when appropriately commanded, to port high pressure to the spring side of each of the throttle valves 144 to implement positive shutdown.

Turning now to a more detailed description of the pump bypass valve 150, this valve 150 includes a valve body 152, a valve element 154, and a bias spring element 156. The valve body 152 includes a main supply line port 151, a select-high pressure port 153, a return port 155, a first setpoint reference port 157, and a second setpoint reference port 159. The main supply line port 151 is in fluid communication with the main supply line 135, the select-high pressure port 153 is in fluid communication with the select-high line 137, the return port 155 and first setpoint reference port 157 are both in fluid communication with the fuel supply line 113 upstream of the check valve 115, and the setpoint reference port 159 is in fluid communication with the fuel supply line 113 downstream of the check valve 115.

The valve element 154 is disposed within the valve body 152 and is movable therein to selectively regulate the fuel pressure in the main supply line 135. Specifically, it regulates the fuel pressure to one of two differential pressure levels above the fuel pressure in the select-high line 137. To implement the two differential pressure levels, the valve element 154 includes an increased diameter section. The fuel pressure acting on one side of this increased diameter section is the pressure in the fuel supply line 113 upstream of the check valve 115, and the fuel pressure acting on the other side of this increased diameter section is the pressure in the fuel supply line 113 downstream of the check valve 115. As should be readily understood from the previous discussions, the pressure in the fuel supply line 113 downstream of the check valve 115 varies depending upon whether the pump control valve 110 is in the first or second control position, and thus the supercharger pump 108 is supplying fuel to this portion of the fuel supply line 113. In particular, when the pump control valve 110 is in the second control position and the supercharger pump 108 is supplying fuel, the pressure at the second setpoint reference port 159 is higher than when the pump control valve 110 is in the first control position, and the pressures at the first and second setpoint reference points 157 and 159 are close to equivalent, the only difference being the pressure differential across check valve 115. As such, the valve element 154 moves to regulate the fuel pressure to a higher differential pressure level above the fuel pressure in the select-high line 137, and thus prevents reverse pressurization of the primary and secondary gear pumps 104, 106 should the supercharger pump 108 be delivering a pressure higher than what would otherwise be produced at the primary gear pump outlet 118.

The gas turbine engine fuel supply system described herein wastes less energy and supplies higher fuel pressures (when needed) than presently known systems. The system includes two positive displacement pumps, a primary pump and a secondary pump, positioned in parallel. The primary pump always actively delivers flow to the downstream fuel system, and is sized to supply 100% of the fuel flow needed at a select low demand condition, typically engine cruise or ground idle operations, whichever is higher. The secondary pump is sized to make up the remainder of the flow at the high demand conditions, and is actively delivering fuel to the downstream fuel system only during those conditions. At low demand conditions, the output of the secondary pump is routed back to its inlet but at a much lower pressure, thereby wasting less energy. To supply higher fuel pressure, a separate high-speed centrifugal pump (a supercharger pump) is disposed upstream of the primary and secondary pumps to raise the inlet pressures thereof, and limit overall pressure rise to manageable levels. The supercharger pump can also be a source of waste energy, so it is preferably activated only during high demand conditions. The pump bypass valve regulates the primary gear pump discharge pressure to a preset differential pressure above the highest of the downstream fuel load pressures, thus enabling the incorporation of a plurality of parallel independent fuel metering/throttling subsystems, In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine fuel supply system, comprising:
   a primary gear pump having a primary gear pump inlet and a primary gear pump outlet, the primary gear pump adapted to receive a drive torque and configured, upon receipt thereof, to draw fuel into the primary gear pump inlet and discharge the fuel from the primary gear pump outlet;
   a secondary gear pump having a secondary gear pump inlet and a secondary gear pump outlet, the secondary gear pump adapted to receive a drive torque and configured, upon receipt thereof, to draw fuel into the secondary gear pump inlet and discharge the fuel from the secondary gear pump outlet;
   a supercharger pump having a supercharger pump inlet and a supercharger pump outlet, the supercharger pump adapted to receive a drive torque and configured, upon receipt thereof, to draw fuel into the supercharger pump inlet and discharge the fuel from the supercharger pump outlet;
   a pump control valve configured to selectively (i) fluidly isolate the supercharger pump from the primary and secondary gear pumps, and fluidly isolate the primary gear pump outlet from the secondary gear pump outlet, and (ii) fluidly communicate the supercharger pump outlet with the primary gear pump inlet and the secondary gear pump inlet, and fluidly communicate the primary gear pump outlet and the secondary gear pump outlet; and a pump bypass valve in fluid communication with the primary gear pump outlet and configured to regulate fuel pressure at the primary gear pump outlet to one of a plurality of preset differential pressures above one of a plurality of fuel load pressures.

2. The system of claim 1, further comprising:
a plurality of fuel metering subsystems, each fuel metering subsystem in fluid communication with the primary gear pump outlet and adapted to receive commands, each fuel metering subsystem configured, in response to the commands it receives, to meter fuel to a fuel load.

3. The system of claim 2, further comprising:
a plurality of select-high valves, each select-high valve disposed downstream of and in fluid communication with one of the fuel metering subsystems, each select-high valve additionally in fluid communication with the bypass valve.

4. The system of claim 1, wherein the pump bypass valve comprises:
a valve body; and
a valve element disposed within the valve body and movable therein to regulate the fuel pressure at the primary gear pump outlet.

5. The system of claim 4, further comprising:
a main supply line coupled to the primary gear pump outlet and the pump bypass valve;
a fuel supply line coupled to the primary gear pump inlet and in fluid communication with the pump control valve, the fuel supply line adapted to couple to a fuel supply source;
a check valve disposed in the fuel supply line upstream of the primary gear pump inlet; and
a select-high line coupled to receive fuel at a plurality of different fuel pressures and in fluid communication with the pump bypass valve body.

6. The system of claim 5, wherein:
the valve body includes a main supply line port, a select-high pressure port, a return port, a first setpoint reference port, and a second setpoint reference port, the main supply line port in fluid communication with the main supply line, the select-high pressure port in fluid communication with the select-high line, the return port in fluid communication with the fuel supply line upstream of the check valve, the first setpoint reference port in fluid communication with the fuel supply line upstream of the check valve, the second setpoint reference port in fluid communication with the fuel supply line downstream of the check valve; and
the valve element is configured to regulate the fuel pressure in the main supply line to one of two differential pressure levels above the fuel pressure in the select-high line.

7. The system of claim 5, wherein:
the valve element includes an increased diameter section having a first side and a second side;
fuel pressure acting on the first side of the increased diameter section is fuel pressure in the fuel supply line upstream of the check valve; and
fuel pressure acting on the second side of this increased diameter section is fuel pressure in the fuel supply line downstream of the check valve.

8. The system of claim 7, wherein when the pump control valve is in the second control position and the supercharger pump is discharging fuel from the supercharger pump outlet:
fuel pressure at the second setpoint reference port is higher than when the pump control valve is in the first control position;
fuel pressure at the first and second setpoint reference ports are substantially equivalent; and the valve element moves to regulate fuel pressure at the primary gear pump outlet to a higher differential pressure level above the fuel pressure in the select-high line.

9. The system of claim 1, further comprising:
a boost pump having a boost pump inlet and a boost pump outlet, the boost pump outlet in fluid communication with the at least the pump control valve, the boost pump adapted to receive a drive torque and configured, upon receipt thereof, to draw fuel into the boost pump inlet and discharge the fuel from the boost pump outlet.

10. The system of claim 9, wherein:
the pump control valve is movable between a first position and a second position;
in the first position, the pump control valve (i) fluidly isolates the supercharger pump from the boost pump, the primary gear pump, and the secondary gear pump and (ii) fluidly isolates the primary gear pump outlet from the secondary gear pump outlet; and
in the second position, the pump control valve fluidly communicates the supercharger pump inlet with the boost pump outlet, fluidly communicates the supercharger pump outlet with the primary gear pump inlet and the secondary gear pump inlet, and fluidly communicates the primary gear pump outlet and the secondary gear pump outlet.

11. The system of claim 10, wherein the pump control valve is coupled to receive a control signal and is configured, in response thereto, to selectively move between the first position and the second position.

12. The system of claim 11, further comprising:
a control signal source configured to supply the control signal to the pump control valve.

13. The system of claim 12, wherein:
the control signal is a hydraulic signal; and
the control signal source comprises a controllable pump control pilot valve.

14. The system of claim 13, wherein the pump control pilot valve comprises:
a pump control pilot valve body including a low-pressure supply port, a supercharger feed inlet port, a supercharger feed outlet port, a control pressure inlet port, and a control pressure outlet port; the low-pressure supply port in fluid communication with the boost pump outlet, the supercharger feed inlet port in fluid communication with the primary gear pump outlet, and the supercharger feed outlet port in fluid communication with the supercharger pump inlet, the control pressure inlet port in fluid communication with the primary gear pump outlet, the control pressure outlet port in fluid communication with the pump control valve;
a pump control pilot valve element movably disposed within the pump control valve body, and is movable between a first pilot position and a second pilot position, wherein:
in the first pilot position the pilot valve element deadheads the low-pressure supply port, fluidly isolates the supercharger feed inlet port from the supercharger feed outlet port, and fluidly couples the control pressure inlet port to the control pressure outlet port, and
in the second pilot position, the pilot valve element fluidly couples the low-pressure supply port to the control pressure outlet port, fluidly couples the supercharger feed inlet port to the supercharger feed outlet port, and fluidly isolates the control pressure inlet port from the control pressure outlet port.

15. The system of claim 14, further comprising:
a pilot valve actuator, the pilot valve actuator adapted to receive a command signal and configured, in response to the command signal, to cause the pilot valve element to move between the first position and the second pilot position.

16. The system of claim 15, wherein the pilot valve actuator comprises an electro-hydraulic servo valve (EHSV) configured to be responsive to the command signal to controllably supply a control fluid pressure to the pump control pilot valve element that moves the pump control pilot valve element between the first and second pilot positions.

17. The system of claim 13, wherein the pump control valve comprises:
a pump control valve body that includes a control signal port, a boost pump outlet port, a supercharger pump inlet port, a supercharger pump outlet port, a supercharger pump vent port, an ejector pump motive supply port, a combined gear pump inlet port, a pressurizing valve control port, a secondary gear pump outlet port, and a primary gear pump outlet port, the control signal port in fluid communication with the pump control pilot valve and receives the control signal therefrom, the boost pump outlet port in fluid communication with the boost pump outlet to receive a portion of the fuel discharged therefrom, the supercharger pump inlet port in fluid communication with the supercharger pump inlet and the supercharger feed outlet port, the supercharger pump outlet port in fluid communication with the supercharger pump outlet, the combined pump inlet port in fluid communication with the primary gear pump inlet, the secondary gear pump inlet and a pressurizing valve, the pressurizing valve control port in fluid communication with the pressurizing valve, the secondary gear pump outlet port in fluid communication with the secondary gear pump outlet, the primary gear pump outlet port in fluid communication with the primary gear pump outlet, and
a pump control valve element is movably disposed within the pump control valve body, the pump control valve element responsive to the control signal to move between a first control position and a second control position,
wherein:
in the first control position, the pump control valve element fluidly isolates the supercharger pump inlet from the boost pump outlet, fluidly couples the supercharger pump outlet to the supercharger pump vent port, fluidly couples the secondary gear pump outlet port to the pressurizing valve control port, fluidly couples the secondary gear pump outlet port to the ejector pump motive supply port, and fluidly isolates the secondary gear pump outlet port from the primary gear pump outlet port, and
in the second control position, the pump control valve element fluidly couples the supercharger pump inlet to the boost pump outlet, fluidly isolates the supercharger pump outlet port from the supercharger pump vent port, fluidly couples the supercharger pump outlet to the primary and secondary gear pump inlets, fluidly isolates the secondary gear pump outlet port from the pressurizing valve control port, fluidly isolates the secondary gear pump outlet from the ejector pump motive supply port, and fluidly couples the secondary gear pump outlet port to the primary gear pump outlet, to thereby connect the primary and secondary gear pumps in parallel.

18. The system of claim 9, further comprising:
an ejector pump coupled to the pump control valve and configured to remove fuel from the supercharger pump when the pump control valve is in the first position.

* * * * *